United States Patent
Strom

(10) Patent No.: US 11,572,972 B2
(45) Date of Patent: *Feb. 7, 2023

(54) CIPP LINER FEEDER SYSTEM

(71) Applicant: Subsurface, Inc., Moorhead, MN (US)

(72) Inventor: Brandon Gregory Strom, Vergas, MN (US)

(73) Assignee: Subsurface, Inc., Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/401,610

(22) Filed: Aug. 13, 2021

(65) Prior Publication Data

US 2021/0372555 A1 Dec. 2, 2021

Related U.S. Application Data

(63) Continuation of application No. 15/396,680, filed on Jan. 1, 2017, now Pat. No. 11,092,276, which is a continuation of application No. 13/866,182, filed on Apr. 19, 2013, now Pat. No. 9,534,726.

(51) Int. Cl.
   *F16L 55/18* (2006.01)
(52) U.S. Cl.
   CPC .................................. *F16L 55/18* (2013.01)
(58) Field of Classification Search
   CPC ................................. F16L 55/18; F16L 55/179
   See application file for complete search history.

(56) References Cited

U.S. PATENT DOCUMENTS

| | | | |
|---|---|---|---|
| 2,562,881 A | 8/1951 | Baldwin | |
| 4,685,983 A | 8/1987 | Long, Jr. | |
| 4,773,666 A | 9/1988 | Koberlein | |
| 5,201,406 A | 4/1993 | Kellis | |
| 5,686,674 A | 11/1997 | Lowry | |
| 6,390,795 B1 | 5/2002 | Waring | |
| 6,439,445 B1 | 8/2002 | De Groot | |
| 6,960,313 B2 | 11/2005 | Waring | |
| 7,374,127 B2 | 5/2008 | Gallagher | |
| 7,476,348 B2 | 1/2009 | Waring | |
| 7,682,106 B1 | 3/2010 | Bowar | |
| 7,988,437 B1 | 8/2011 | Bonanotte | |
| 9,534,726 B1 | 1/2017 | Strom | |
| 2002/0163102 A1 | 11/2002 | Thompson | |

(Continued)

FOREIGN PATENT DOCUMENTS

DE 19702854 A1 7/1998

OTHER PUBLICATIONS http://cipp-services.com/air-inverters.html; CIPP Services "Air Inverters—Shooters" Webpage; Apr. 13, 2013.

(Continued)

*Primary Examiner* — Ryan M Ochylski
(74) *Attorney, Agent, or Firm* — Neustel Law Offices

(57) ABSTRACT

A CIPP liner feeder system for efficiently feeding CIPP liner into an air inversion unit. The CIPP liner feeder system generally includes a feed roller attached to an air inverter unit that is adjustable to a first position for feeding a CIPP liner into the air inverter unit from the front or a second position for feeding a CIPP liner into the air inverter unit from the rear. A motor is connected to the feed roller to rotate the feed roller in a first direction when the feed roller is in the first position and a second direction when the feed roller is in the second position. A connecting structure is attached to the air inverter unit for connecting to a lifting/lowering structure of a tractor.

20 Claims, 10 Drawing Sheets

(56) References Cited

U.S. PATENT DOCUMENTS

2003/0024858 A1   2/2003   Stibbard
2007/0029688 A1   2/2007   Delaney
2010/0326481 A1  12/2010   Buckner
2011/0180639 A1   7/2011   Lester
2012/0199276 A1   8/2012   Rodenberger
2013/0263443 A1  10/2013   Delaney

OTHER PUBLICATIONS http://cipp-services.com/refrigerated-trucks.html; CIPP Services "Refrigerated Liner Unloader Trailers" Webpage; Apr. 16, 2013.

CIPP LINER FEEDER SYSTEM

CROSS REFERENCE TO RELATED APPLICATIONS

The present application is a continuation of U.S. application Ser. No. 15/396,680 filed on Jan. 1, 2017 which issues as U.S. Pat. No. 11,092,276 on Aug. 17, 2021, which is a continuation of U.S. application Ser. No. 13/866,182 filed on Apr. 19, 2013 now issued as U.S. Pat. No. 9,534,726. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND OF THE INVENTION

Field of the Invention

The present invention relates generally to a CIPP liner air inversion system and more specifically it relates to a CIPP liner feeder system for efficiently feeding CIPP liner into an air inversion unit.

Description of the Related Art

Any discussion of the related art throughout the specification should in no way be considered as an admission that such related art is widely known or forms part of common general knowledge in the field.

CIPP liners have been used for many years for the rehabilitation of different types and sizes of conduit and piping systems such as utility, sewer, water, electric, telecom, industrial, petroleum, fire suppression, heating, cooling and the like. The majority of materials used to manufacture these liners is felt and fleece type fabrics which have a thin flexible PVC or Polyurethane type jacket coating on one side. The liners are usually impregnated with a thermosetting type resin then installed by inverting the liner inside of the host conduit or pipe with air or water.

There are many types of CIPP lining inversion systems including canister or drum styles and non-canister styles or "shooters". The air inverter typically has a passive, non-motorized, guide roller positioned above the inlet opening of the air inverter to guide the CIPP liner vertically into the inlet opening. Another method of inserting the liners is by pulling the liners through the host pipe. The CIPP liner is often times transported to the installation site with a refrigerated truck (or trailer) to keep the temperature of the CIPP liner reduced and the CIPP liner is directly dispensed to the CIPP liner air inverter unit. The refrigerated truck includes a conveyor at the upper rear portion thereof that extends outwardly from the rear end of the truck to dispense the CIPP liner outwardly from the truck.

There are typically no problems of feeding the CIPP liner when the truck is able to be positioned adjacent or near the air inverter unit such as when installing the CIPP liner in a culvert under a roadway. However, when the truck containing the CIPP liner is unable to be near the air inverter unit, workers must manually pull upon and manipulate the CIPP liner from the truck because of the distance and to prevent the CIPP liner from becoming stuck in the air inverter unit. This manual process is labor intensive and time consuming since the CIPP liner often times becomes frictionally stuck in the air inverter unit thereby requiring the installers to manually attempt to get the CIPP liner to proceed through the conduit which significantly disrupts the installation of the CIPP liner. Another problem encountered with air inverter units is that the air pressure within the CIPP liner beneath the air inverter unit can result in the air inverter unit being lifted upwardly and misaligned further slowing the CIPP liner installation.

Because of the inherent problems with the related art, there is a need for a new and improved CIPP liner feeder system for efficiently feeding CIPP liner into an air inversion unit.

BRIEF SUMMARY OF THE INVENTION

The invention generally relates to CIPP liner inversion units which includes a feed roller attached to an air inverter unit that is adjustable to a first position for feeding a CIPP liner into the air inverter unit from the front or a second position for feeding a CIPP liner into the air inverter unit from the rear. A motor is connected to the feed roller to rotate the feed roller in a first direction when the feed roller is in the first position and a second direction when the feed roller is in the second position. A connecting structure is attached to the air inverter unit for connecting to a lifting/lowering structure of a tractor.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
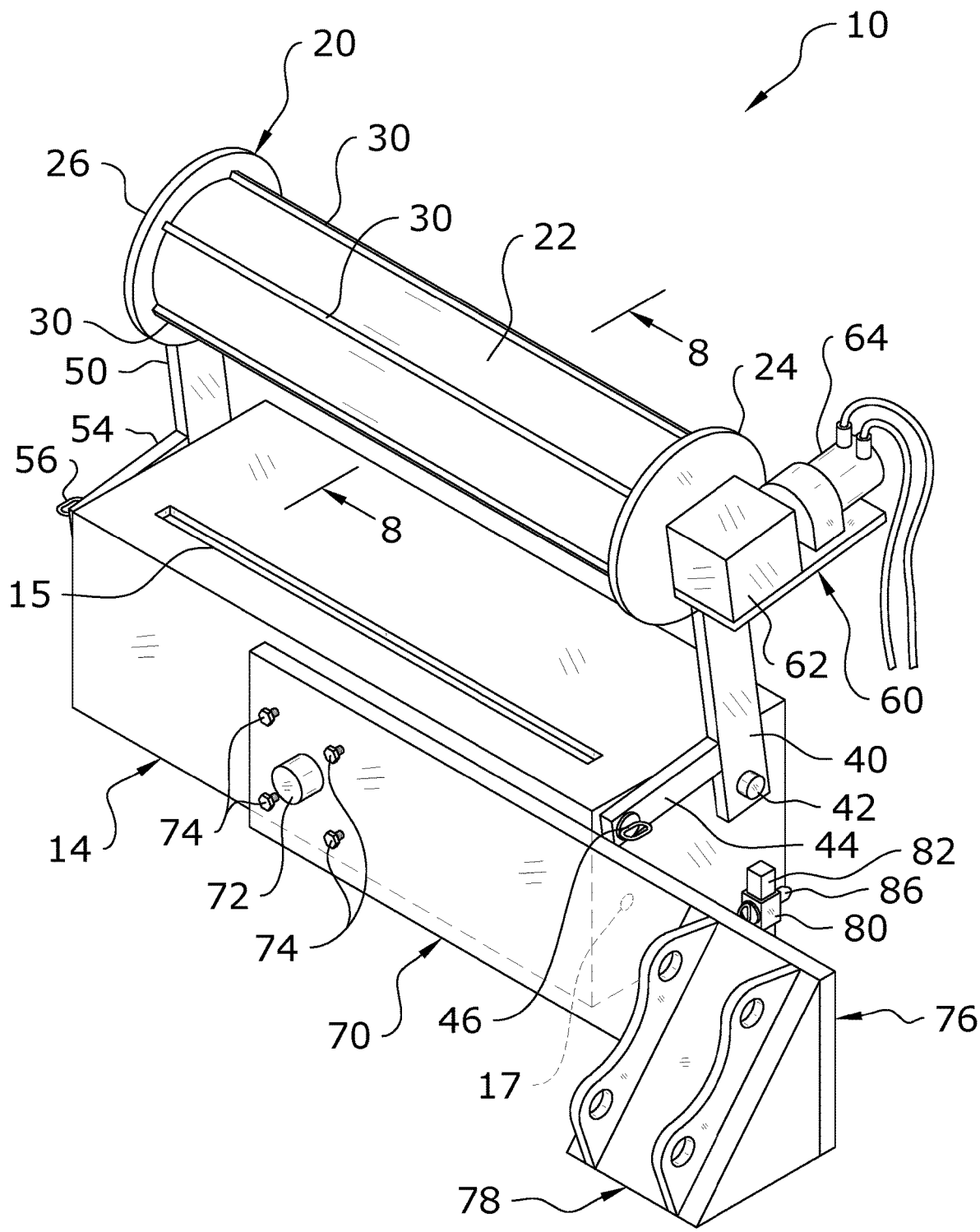
FIG. 1 is a rear upper perspective view of the present invention with the feed roller in the first position for feeding the CIPP liner from the front.

Turning now descriptively to the drawings, in which similar reference characters denote similar elements throughout the several views, FIGS. 1 through 10 illustrate a CIPP liner feeder system 10, which comprises a feed roller 20 attached to an air inverter unit 14 that is adjustable to a first position for feeding a CIPP liner 13 into the air inverter unit 14 from the front or a second position for feeding a CIPP liner 13 into the air inverter unit 14 from the rear. A motor 64 is connected to the feed roller 20 to rotate the feed roller 20 in a first direction when the feed roller 20 is in the first position and a second direction when the feed roller 20 is in the second position. A connecting structure 70 is attached to the air inverter unit 14 for connecting to a lifting/lowering structure of a tractor.

B. CIPP Liner

FIG. 1 illustrates an exemplary cured-in-place pipe (CIPP) liner having an exterior surface. The CIPP liner 13 has an outer diameter that corresponds to the interior diameter of the conduit to be installed in. The CIPP liner 13 can be utilized to rehabilitate conduit having diameters ranging from 6 to 96 inches.

The CIPP liner 13 may be comprised of various materials such as but not limited to non-woven polyester felt, fibre reinforced fabric, polyester felt, glass reinforced polyester felt, glass fibre structured fabric, circular woven polyester fibre hose, woven hose plus felt, and woven hose plus felt and structured glass fibre fabric. The CIPP liner 13 is typically impregnated with a polyester resin or epoxy resin.

Figure 2:
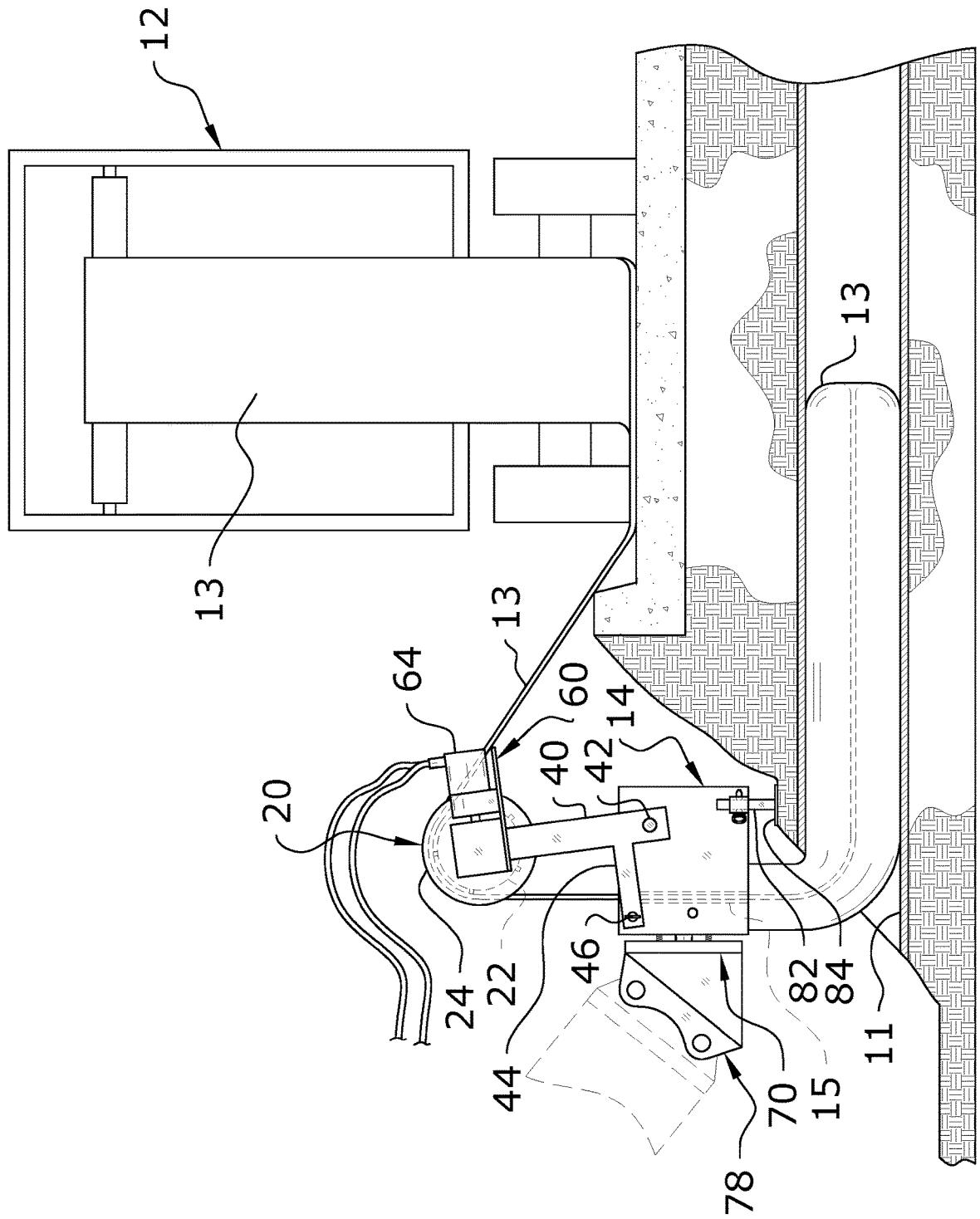
FIG. 2 is a right side view of the present invention with the feed roller in the first position and feeding the CIPP liner from the front to the air inverter unit with the CIPP liner being inserted into a horizontal culvert.
Figure 3:
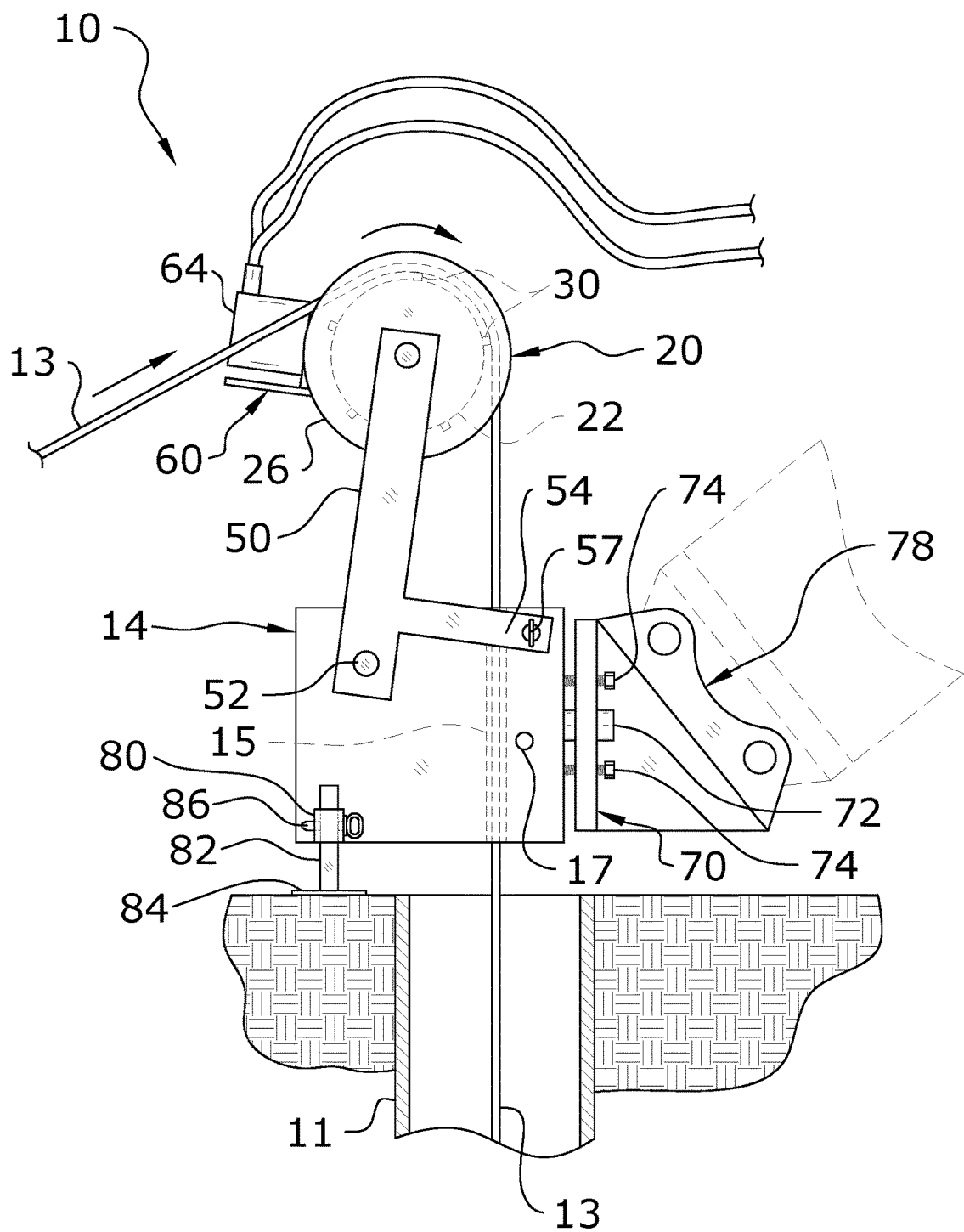
FIG. 3 is a left side view of the present invention with the feed roller in the first position and feeding the CIPP liner from the front to the air inverter unit with the CIPP liner being inserted into a vertical manhole.

The CIPP liner 13 may be installed within a conduit (e.g. pipe, gas pipelines, water pipelines, sewer pipelines) via a liner inversion process with the air inverter unit 14. The CIPP liner 13 is initially in a compact flattened state and folded within a liner source 12 such as a refrigerated truck as shown in FIGS. 2 and 3 of the drawings. The exterior surface of the CIPP liner 13 is comprised of a first surface and a second surface in opposition to the first surface. The first surface of the CIPP liner 13 is substantially parallel with respect to the second surface and two opposing edge portions are positioned between the surfaces. When the CIPP liner 13 is inverted prior to installation for usage with the air inverter unit 14, it is preferable to lubricate the exterior surface of the CIPP liner 13 prior to the CIPP liner 13 entering the air inverter unit 14 to reduce the friction caused by the inversion of the CIPP liner 13. During the inversion process, the exterior surface eventually becomes the interior surface of the CIPP liner 13 once installed within the conduit. After the CIPP liner 13 is positioned within the conduit, thermal curing with steam or heated water forced through the CIPP liner 13 pushes the liner against the interior walls of the conduits and cures the impregnated resin within the CIPP liner 13. UV light may also be utilized to cure the CIPP liner 13 within the conduit.

C. Air Inverter Unit

The air inverter unit 14 may be comprised of any device capable of receiving a CIPP liner 13 and inverting the CIPP liner 13 to perform an inversion process within a conduit. Examples of suitable air inverter units 14 are canister/drum style units and shooter style units. The present invention preferably utilizes a shooter style for the air inverter unit 14 which is well known in the industry. U.S. Pat. No. 7,476,348 to Waring illustrates an exemplary shooter style air inverter unit 14 and is hereby incorporated by reference.

Figure 5:
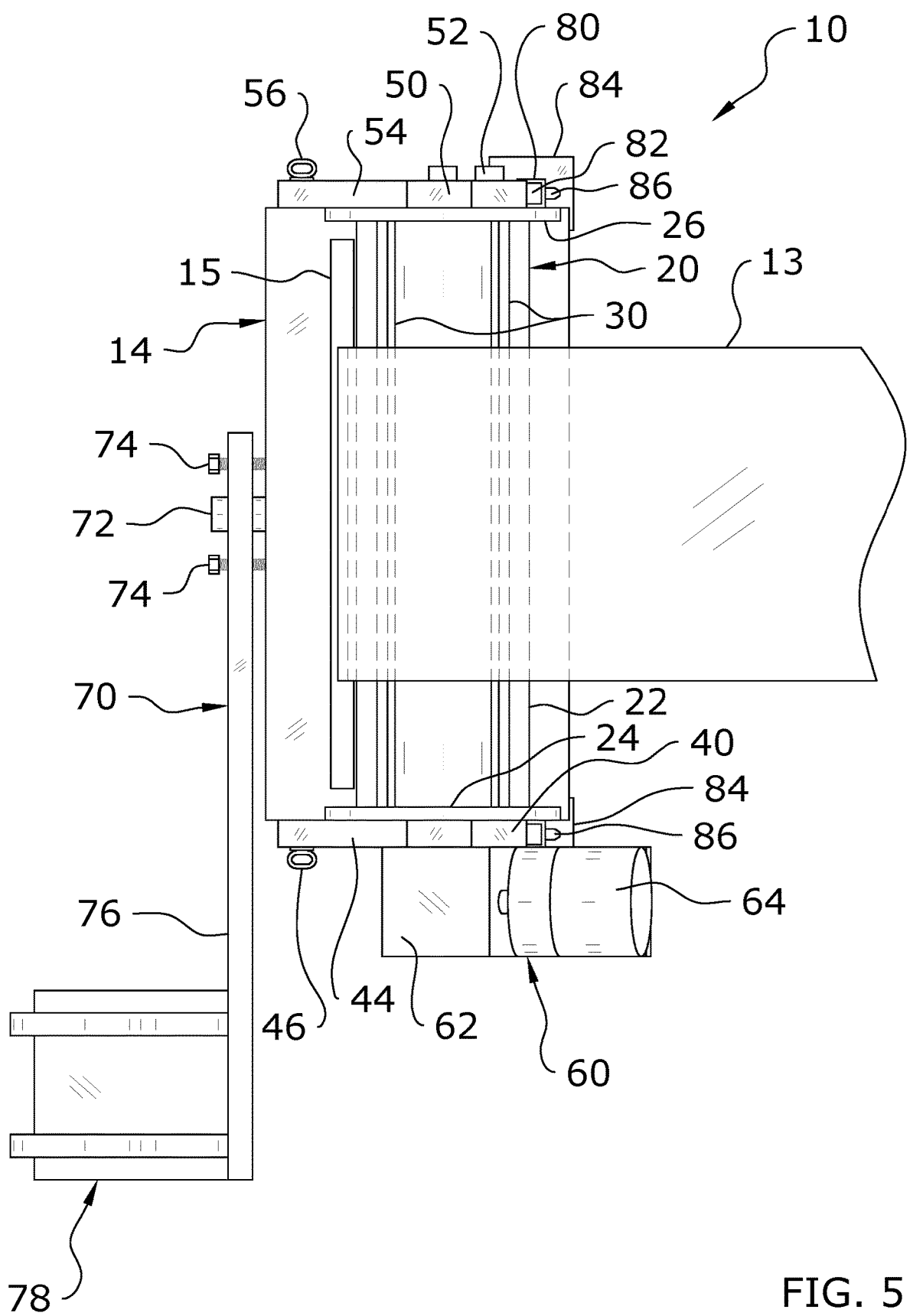
FIG. 5 is a top view of the present invention with the feed roller in the first position for feeding the CIPP liner from the front.
Figure 6:
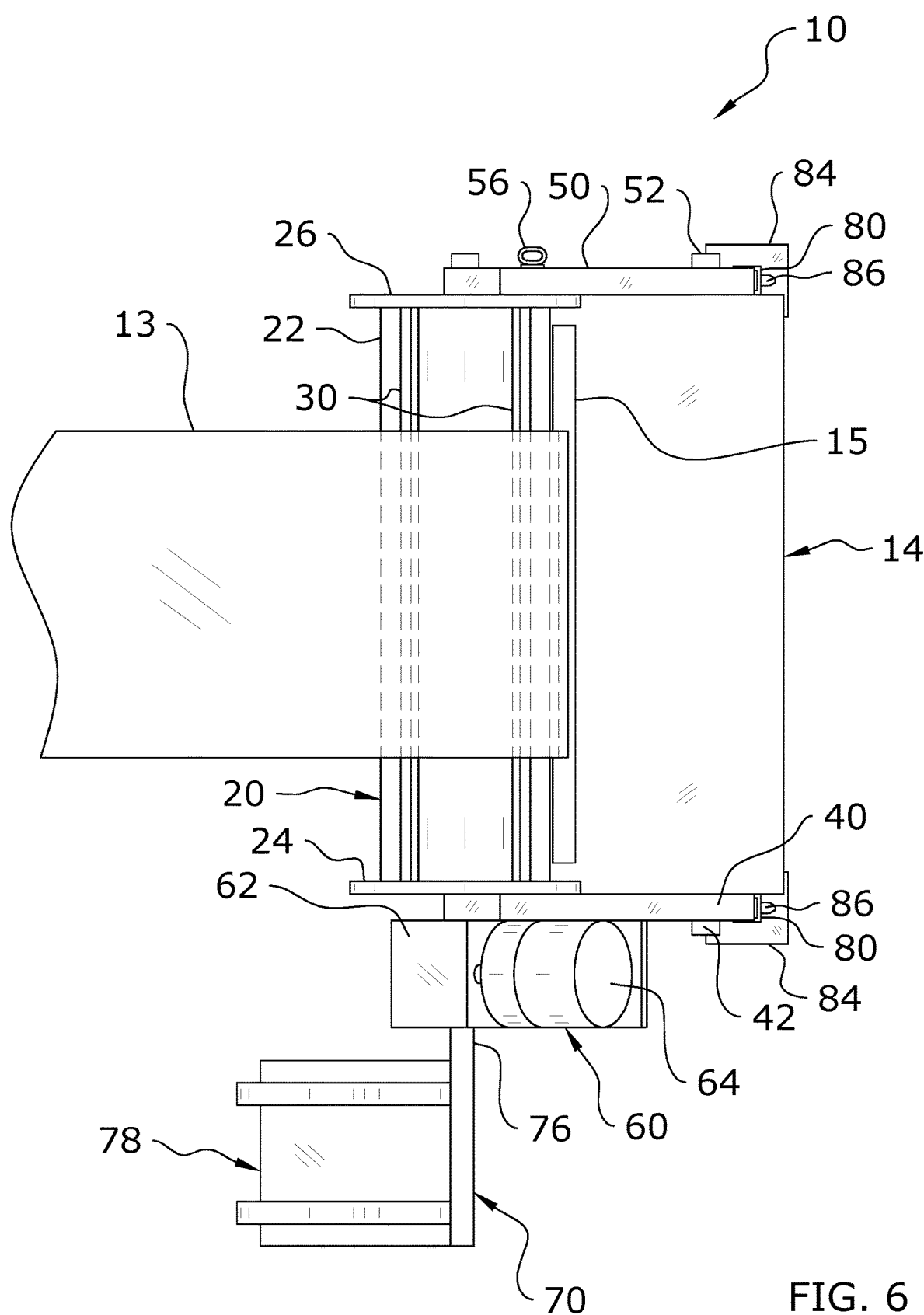
FIG. 6 is a top view of the present invention with the feed roller in the second position for feeding the CIPP liner from the rear.

The air inverter unit 14 includes an inlet opening 15 in the upper portion thereof to receive the CIPP liner 13 and an outlet opening to dispense the CIPP liner 13 in an inverted manner. The inlet opening 15 is comprised of an elongated narrow opening that receives the CIPP liner 13 in the flattened state as illustrated in FIGS. 1, 5 and 6. For a canister type of air inverter unit 14, the inlet is the same as the outlet. Pressurized air or liquid is utilized within the air inverter unit 14 to force the inversion of the CIPP liner 13 within the conduit whereby the CIPP liner 13 expands through the conduit.

D. Connecting Structure

Figure 7:
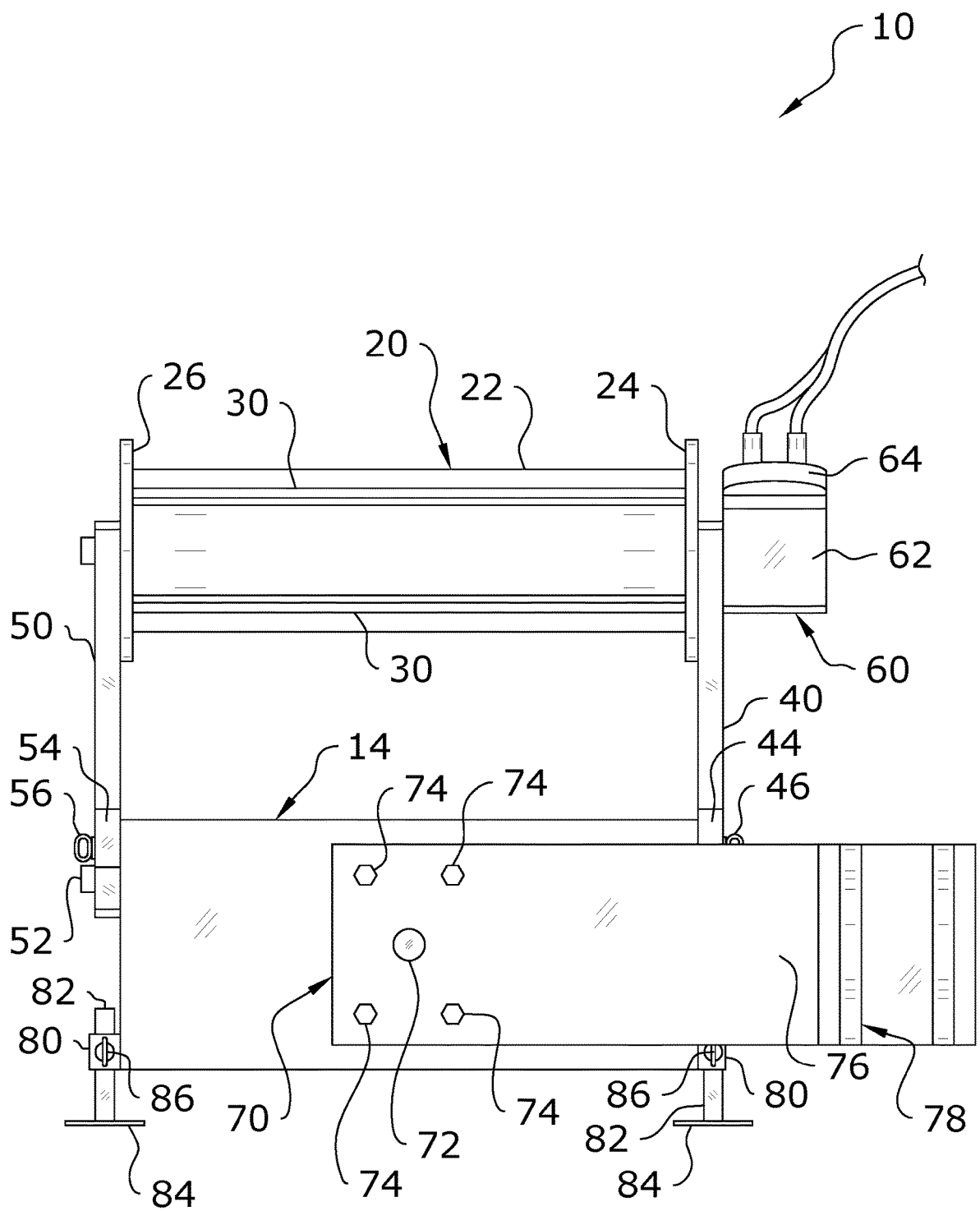
FIG. 7 is a rear view of the present invention with a backhoe connector.
Figure 8:
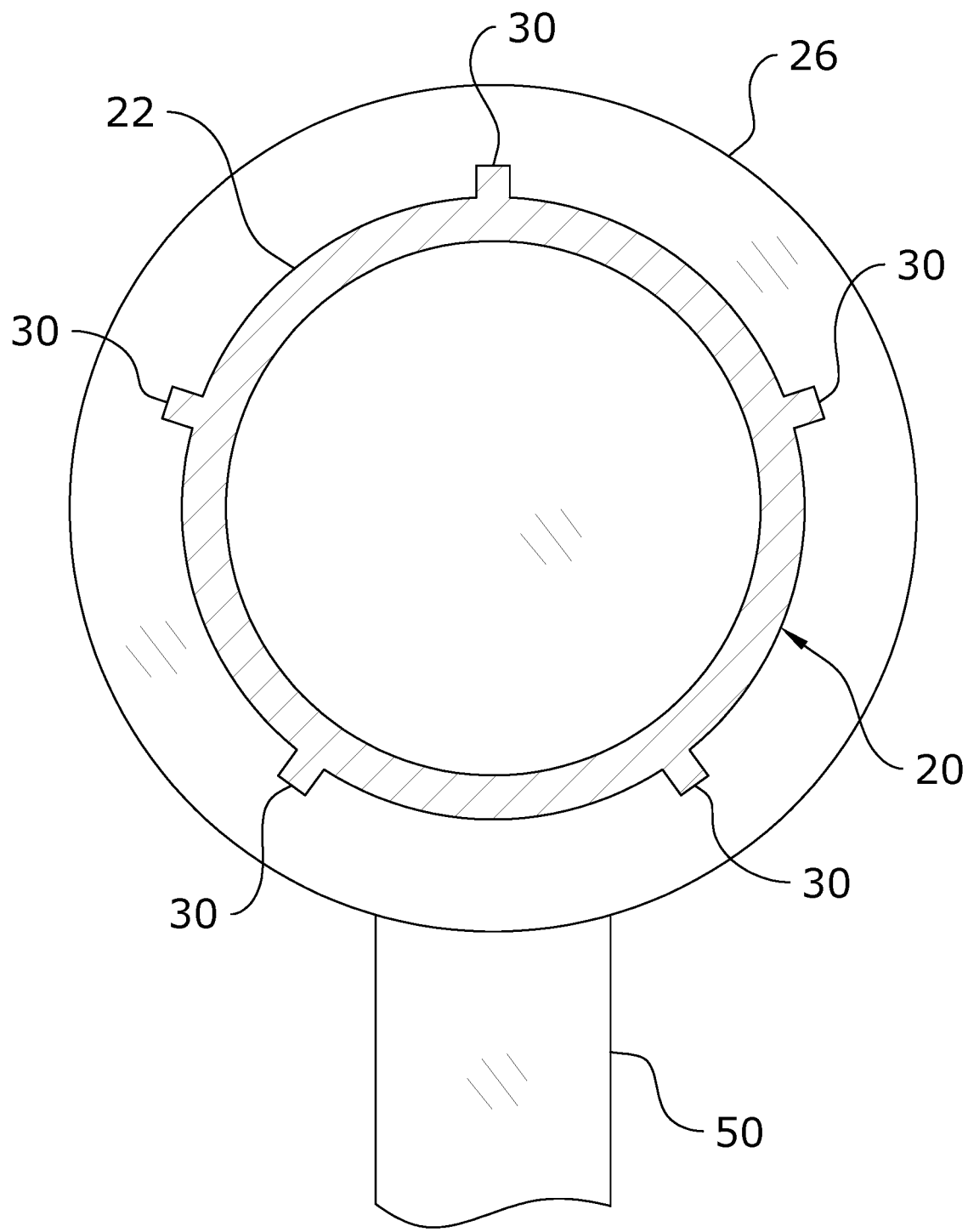
FIG. 8 is a cross sectional view taken along line 8-8 of FIG. 1 showing the cross section of the feed roller.
Figure 9:
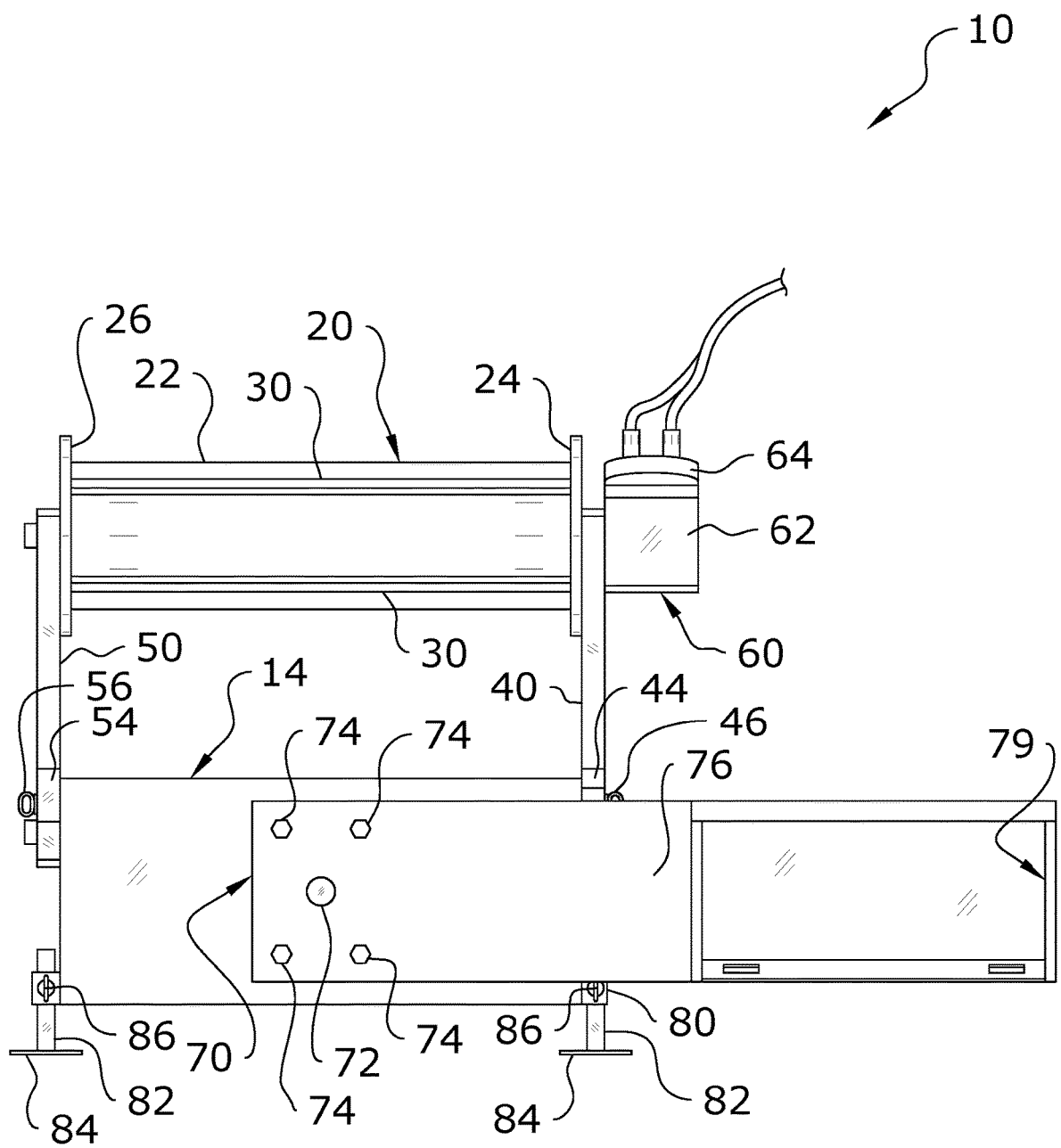
FIG. 9 is a rear view of the present invention with a skid steer connector.
Figure 10:
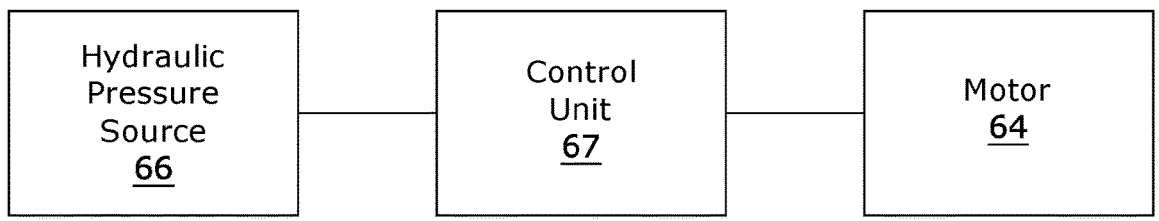
FIG. 10 is a block diagram illustrating the fluid communications for the control unit and motor.

FIGS. 1, 7 and 9 best illustrating connecting structure 70 attached to the air inverter unit 14 for connecting to a tractor (e.g. a backhoe, skid steer loader etc.). The connecting structure 70 includes a connector 78, 79 for connecting to a lifting/lowering structure of a tractor such as the loader of the tractor.

The connecting structure 70 may be non-movably connected or pivotally connected to the air inverter unit 14. It is preferable for the connecting structure 70 to be pivotally connected to allow for adjustment of the angle of the air inverter unit 14 with respect to the tractor. The connecting structure 70 may be centrally positioned with respect to the air inverter unit 14 where the connector 78, 79 is connected centrally upon the connecting structure 70. However, it is preferable that the connecting structure 70 is elongated with an extended portion 76 that extends outwardly past a side of the air inverter unit 14 as illustrated in FIGS. 1, 7 and 9 of the drawings. The connector 78, 79 is attached to the distal portion of the extended portion 76 so as to distally space the tractor and the lifting/lower structure of the tractor away from the air inverter unit 14 to provide space for workers during the CIPP liner 13 inversion process and to allow the CIPP liner 13 to be fed from the rear of the air inverter unit 14 without obstruction.

As indicated previously, the connecting structure 70 is preferably pivotally connected to allow for the air inverter unit 14 to pivot about the axis of a pivot pin 72, wherein the axis of the pivot pin 72 is transverse with respect to a longitudinal axis of the connecting structure 70. This allows the air inverter unit 14 along with the feed roller 20 to be pivoted from side-to-side to accommodate various types of terrain adjacent to a culvert or drainage pipe (reference numeral 11 in FIG. 2), surrounding a manhole (reference numeral 11 in FIG. 3) or similar opening to the conduit. One or more locking members 74 (e.g. threaded fasteners that threadably engage the connecting structure 70 and frictionally engage a plate of the air inverter unit 14 to prevent pivoting) are attached to the connecting structure 70 that selectively engage the air inverter unit 14 to prevent pivoting of the air inverter unit 14 with respect to the connecting structure 70. When the locking members 74 are released, the air inverter unit 14 is allowed to freely pivot. For forward/rearward adjustment of the air inverter unit 14, the operator of the tractor utilizes the lifting/lowering structure to adjust the same.

In addition, one or more adjustable alignment supports are attached to the sides of the air inverter unit 14 to provide additional stability during usage. The alignment supports are vertically adjustable to adjust the vertical position of the left side and right side of the air inverter unit 14 with respect to the ground surface. Each of the alignment supports includes an alignment support tube 80 attached to the side of the air inverter unit 14, a support member 82 having one or more holes that is slidably positioned within the alignment support tube 80, a support pad 84 attached to the bottom end of the support member 82 and a support pin 86 that is removably extendable through the alignment support tube 80 and the support member 82 to lock the desired vertical position with respect to the ground surface for each side of the air inverter unit 14.

E. Support Arms

Figure 4:
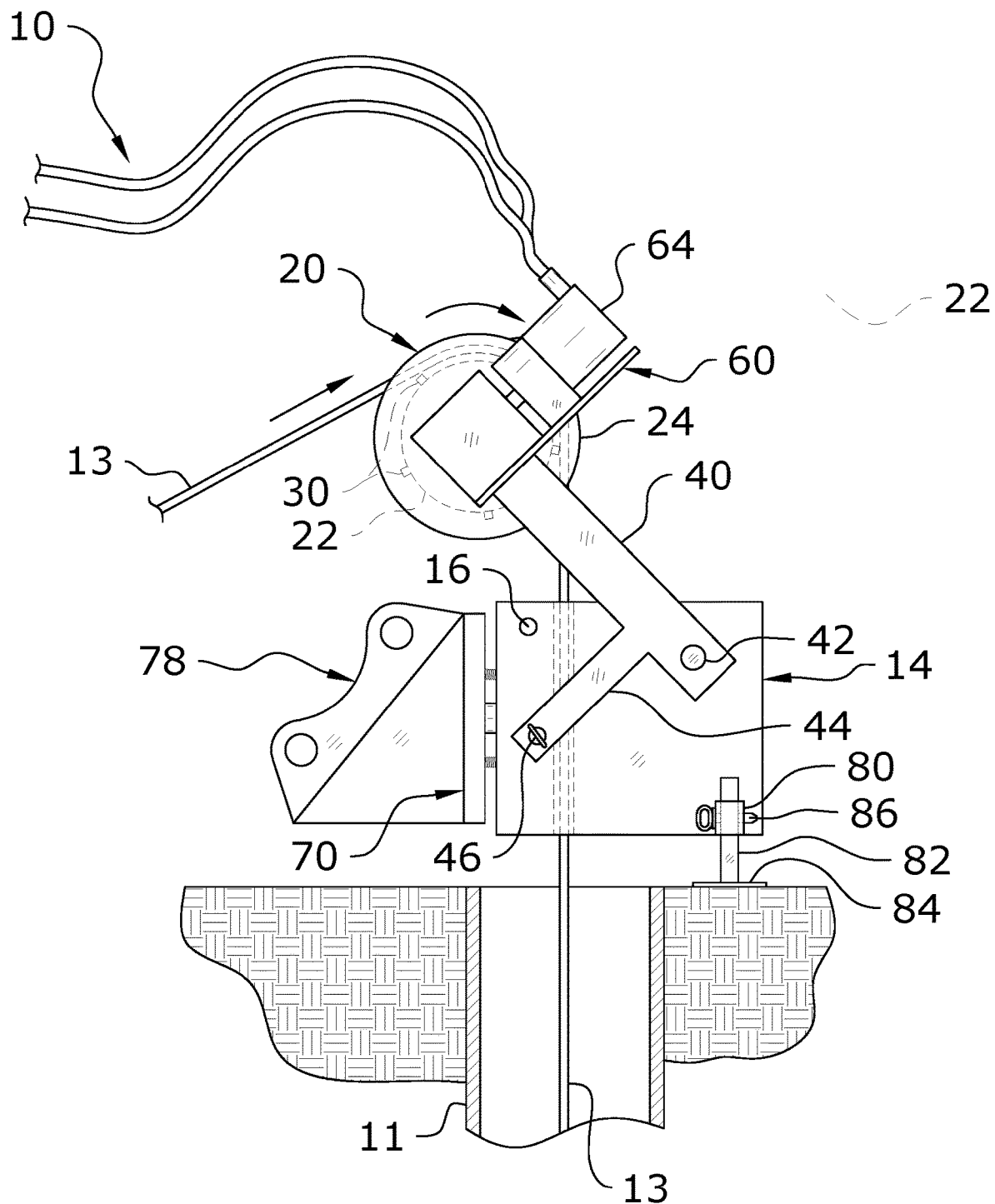
FIG. 4 is a left side view of the present invention with the feed roller in the second position and feeding the CIPP liner from the rear to the air inverter unit.

FIGS. 1, 5, 6, 7 and 9 illustrate the first support arm 40 and the second arm extending upwardly from the air inverter unit 14 to rotatably support the feed roller 20. The first support arm 40 is pivotally connected to a right side of the air inverter unit 14 at a first pivot point 42 as illustrated in FIGS. 1 and 2 of the drawings. The second support arm 50 is pivotally connected to the left side of the air inverter unit 14 at a second pivot point 52 as illustrated in FIGS. 3 and 4 of the drawings. The first support arm 40 and the second support arm 50 extend upwardly a sufficient distance to support the feed roller 20 above the inlet opening 15 of the air inverter unit 14 to vertically align the CIPP liner 13 with the inlet opening 15.

The support arms 40, 50 each have a first position and a second position to allow for feeding of the CIPP liner 13 from either the front or rear of the air inverter unit 14 as illustrated in FIGS. 2 through 4 of the drawings. In particular, the support arms 40, 50 are extended substantially upright when in the first position so that a rear vertical surface of the feed roller 20 is substantially aligned and vertically positioned above the inlet opening 15 thereby allowing for feeding of the CIPP liner 13 from the front of the air inverter unit 14 as illustrated in FIGS. 2 and 3 of the drawings. The support arms 40, 50 are lowered to a lower angle when in the second position so that a front vertical surface of the feed roller 20 is substantially aligned and vertically positioned above the inlet opening 15 thereby allowing for feeding of the CIPP liner 13 from the rear of the air inverter unit 14 as illustrated in FIGS. 2 and 3 of the drawings.

The support arms 40, 50 are retained within either the first position or the second position with fasteners and the like. FIGS. 1 through 4 illustrate a preferred adjustment system for the support arms 40, 50 comprised of a first position member 44 extending from the first support arm 40 at an angle and a second position member 54 extending from the second support arm 50 at an angle to support the support arms 40, 50 in either the first position or the second position. In particular, the distal ends of the position members 44, 54 each include an aperture that is aligned with the first apertures 16 within the sides of the air inverter unit 14 when the support arms 40, 50 are in the first position (as illustrated in FIGS. 1 through 3) and that is aligned with the second apertures 17 within the sides of the air inverter unit 14 when the support arms 40, 50 are in the second position (as illustrated in FIG. 4).

A first locking pin 46 is removable inserted into the aperture within the first position member 44 and the corresponding aperture 16, 17 within the air inverter unit 14 to maintain the first support arm 40 and the feed roller 20 in the first or second positions. A second locking pin 56 is removable inserted into the aperture within the second position member 54 and the corresponding aperture 16, 17 within the air inverter unit 14 to maintain the second support arm 50 and the feed roller 20 in the first or second positions. The apertures 16, 17 within the sides of the air inverter unit 14 are positioned along an arc path that corresponds to the arc path of the distal ends of the position members 44, 54 as the support arms 40, 50 are pivoted with respect to the air inverter unit 14.

F. Feed Roller

The feed roller 20 is rotatably supported between the first support arm 40 and the second support arm 50. As discussed previously, the feed roller 20 is adjustable to a first position for feeding a CIPP liner 13 into the air inverter unit 14 from a front of the air inverter unit 14 or a second position for feeding a CIPP liner 13 into the air inverter unit 14 from a rear of the air inverter unit 14. The feed roller 20 is rotatably positioned above the air inverter unit 14 and particularly such that either the front vertical surface or the rear vertical surface of the feed roller 20 is positioned directly above the inlet opening 15 of the air invert unit to vertically feed the CIPP liner 13 thereto.

The feed roller 20 includes an elongated portion 22 extending parallel with respect to the inlet opening 15. The elongated portion 22 has a longitudinal axis that the feed roller 20 rotates about. The longitudinal axis of the feed roller 20 is parallel with respect to the longitudinal axis of the inlet opening 15. The elongated portion 22 has a length that is equal to or greater than the width of the CIPP liner 13 being installed when the CIPP liner 13 is in the flattened state. The elongated portion 22 is preferably as long or longer than the length of the inlet opening 15. The elongated portion 22 is preferably tubular and cylindrical having a circular cross sectional shape. The diameter of the elongated portion 22 is preferably at least one foot or more to maximize the surface area contact with the CIPP liner 13 to prevent slippage between the CIPP liner 13 and the feed roller 20. The elongated portion 22 may be comprised of a solid or semi-solid structure. In addition, the elongated portion 22 may have various other cross sectional shapes such as hexagonal, square and the like.

A first flange 24 at a first end of the elongated portion 22 and a second flange 26 at a second end of the elongated portion 22. The first flange 24 and the second flange 26 guide the CIPP liner 13 to ensure that the CIPP liner 13 does not accidentally fall off the feed roller 20 during operation. The first flange 24 and the second flange 26 are preferably circular shaped.

To ensure adequate engagement of the CIPP liner 13 during installation, a plurality of gripping members 30 preferably extend from an exterior surface of the elongated portion 22 to engage and grip the CIPP liner 13 as the CIPP liner 13 is pulled by the feed roller 20 from an approximately horizontal path. The plurality of gripping members 30 are preferably comprised of a plurality of elongated members each having a rectangular cross sectional shape thereby providing at least two right-angle contact points for engaging the CIPP liner 13. The gripping members 30 may have various other cross sectional shapes such as triangular, circular and the like. The gripping members 30 are preferably a solid structure but may be hollow. Each of the gripping members 30 preferably extends along the entire length of the elongated portion 22 of the feed roller 20 to maximize the engagement area on the CIPP liner 13. The gripping members 30 are preferably equidistantly spaced upon the outer surface of the feed reel. In addition, the gripping members 30 have a thickness of at least ¼ of an inch. The gripping members 30 prevent slippage of the CIPP liner 13 with respect to the feed roller 20 as the feed roller 20 frictionally engages and draws upon the CIPP liner 13 from the liner source 12.

G. Drive Unit

A drive unit 60 is mechanically connected to the feed roller 20 either directly or indirectly (e.g. via chain, belt, etc.) to rotate the feed roller 20. The drive unit includes a motor 64 that is mechanically connected to the feed roller 20 and rotates the feed roller 20 to pull a CIPP liner 13 from a liner source 12. The motor 64 preferably rotates the feed roller 20 in a first direction when the feed roller 20 is in the first position as illustrated in FIG. 1 and a second direction when the feed roller 20 is in the second position as illustrated in FIG. 4.

The motor 64 is in communication with a control unit 67 for controlling the operation of the motor 64. When not being used, the motor 64 is deactivated by the control unit 67 to prevent rotation thereof. When feeding the CIPP liner 13 to the air inverter unit 14, the motor 64 is activated to rotate the feed roller 20 at a desired speed. The rotational speed of the feed roller 20 is adjustable by the control unit 67 to increase or decrease the rotational speed of the feed roller 20 as needed. In particular, some installations may require the feed roller 20 to feed the CIPP liner 13 at a speed slightly faster than the CIPP liner 13 is expanded within the conduit to ensure that there is no additional resistance to the CIPP liner 13 thereby preventing the CIPP liner 13 from becoming "stuck". Some installations may require the CIPP liner 13 to be delivered by the feed roller 20 at a speed approximately the same as the speed the CIPP liner 13 is expanded through the conduit. Finally, some installations may require the CIPP liner 13 to be delivered by the feed roller 20 at a speed slightly slower than the speed of the CIPP liner 13 being expanded through the conduit to provide a slight additional resistance to the CIPP liner 13 passing through the air inverter unit 14.

The motor 64 is preferably comprised of a hydraulic motor 64 that is hydraulically powered by a hydraulic pressure source 66 (e.g. the hydraulic system of the tractor connected to the invention). The control unit 67 is preferably comprised of a valve box that controls the flow of the hydraulic fluid from the hydraulic pressure source 66 to the motor 64 via hydraulic hoses fluidly connected to the motor 64. The flow of the hydraulic fluid causes the motor 64 to rotate in the first direction or the second direction as discussed previously.

The motor 64 is attached to either the first support arm 40 or the second support arm 50 to drive the feed roller 20 from one side thereof. The drive shaft of the motor 64 is connected to the feed roller 20 either concentrically or transversely. When transversely connected, it is preferable to utilize a gear box 62 between the motor 64 and the feed roller 20 as illustrated in FIGS. 1 and 2 of the drawings. The motor 64 may alternatively be comprised of an electric actuator and the like.

H. Operation of Preferred Embodiment

Initially, the CIPP liner 13 is provided within a liner source 12 (e.g. refrigerated truck) and in a folded, flattened state. The liner source 12 is transported to the installation site where the CIPP liner 13 inversion process is to be performed. The liner source 12 is preferably positioned as close as possible to culvert 11 (FIG. 2), manhole 11 (FIG. 3) or similar opening providing access to the conduit to be lined with the CIPP liner 13. The distal end of the CIPP liner 13 is removed from the liner source 12 and manually pulled to the liner installation location. The distal end of the CIPP liner 13 is then extended over the feed roller 20 and then through the inlet opening 15 of the air inverter unit 14 and then attached to the bottom portion of the air inverter unit 14 in an inverted manner such that air or liquid pressure from the air inverter unit 14 shoots the CIPP liner 13 through the culvert or a manhole then through a conduit in an inverted manner during an inversion process which is widely practiced in the CIPP industry.

The CIPP liner 13 is forced through the conduit (e.g. culvert, pipe, etc.) being lined during the inversion process. The distal end of the CIPP liner 13 draws itself through the conduit being lined thereby pulling the CIPP liner 13 through the conduit. As the CIPP liner 13 draws itself through the conduit, the feed roller 20 rotates simultaneously thereby reducing the amount of pulling force the CIPP liner 13 has to generate to continue the passage of the CIPP liner 13 through the conduit. The speed of the feed roller 20 can be adjusted so that there is some resistance by the feed roller 20 as to slightly slow the speed of the CIPP liner 13 compared to if the feed roller 20 is providing the CIPP liner 13 to the air inverter unit 14 at approximately the same speed or faster than the speed the CIPP liner 13 expands through the conduit. As the CIPP liner 13 is shot through the conduit and inverted at the distal end, the friction is significantly reduced by a lubricant that is applied to the exterior surface of the CIPP liner 13 prior to installation. After the CIPP liner 13 is installed within the conduit, the lubricant eventually evaporates without leaving any significant residue within the interior of the CIPP liner 13 and the CIPP liner 13 is then cured (e.g. by heat, UV light) within the conduit to cure the resin within the CIPP liner 13.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A CIPP liner feeder system, comprising:
   an air inverter unit having an inlet opening;
   a feed roller rotatably supported upon the air inverter unit, wherein the feed roller is positioned above the air inverter unit;
   a motor connected to the feed roller, wherein the motor is adapted to rotate the feed roller to pull a CIPP liner from a liner source and feed the CIPP liner into the inlet opening of the air inverter unit; and
   a control unit in communication with the motor, wherein the control unit is configured to control the motor to adjust a rotational speed of the feed roller.

2. The CIPP liner feeder system of claim 1, wherein the rotational speed of the feed roller is slightly faster than a speed of the CIPP liner.

3. The CIPP liner feeder system of claim 1, wherein the feed roller is adjustable to a first position for feeding a CIPP liner into the air inverter unit from a front of the air inverter unit or a second position for feeding a CIPP liner into the air inverter unit from a rear of the air inverter unit.

4. The CIPP liner feeder system of claim 3, wherein the motor rotates the feed roller in a first direction when the feed roller is in the first position and a second direction when the feed roller is in the second position.

5. The CIPP liner feeder system of claim 1, including a gearbox connected between the feed roller and the motor.

6. The CIPP liner feeder system of claim 1, wherein the motor is comprised of a hydraulic motor.

7. The CIPP liner feeder system of claim 1, wherein the feed roller includes an elongated portion extending parallel with respect to the inlet opening, wherein the elongated portion has a length sufficient to receive a width of the CIPP liner in a flattened state.

8. The CIPP liner feeder system of claim 7, wherein the feed roller includes a first flange at a first end of the elongated portion and a second flange at a second end of the elongated portion.

9. The CIPP liner feeder system of claim 7, including a plurality of gripping members extending from an exterior surface of the elongated portion.

10. The CIPP liner feeder system of claim 9, wherein the plurality of gripping members are comprised of a plurality of elongated members each having a rectangular cross sectional shape.

11. The CIPP liner feeder system of claim 1, wherein the control unit is configured to control the motor to increase or decrease the rotational speed of the feed roller.

12. The CIPP liner feeder system of claim 1, further comprising a connecting structure attached to the air inverter unit adapted for connecting to a lifting/lowering structure of a vehicle.

13. The CIPP liner feeder system of claim 12, wherein the connecting structure is pivotally connected to the air inverter unit.

14. The CIPP liner feeder system of claim 12, wherein the connecting structure is elongated and wherein an extended portion of the connecting structure extends outwardly past a side of the air inverter unit.

15. The CIPP liner feeder system of claim 12, including a plurality of locking members attached to the connecting structure, wherein the plurality of locking members selectively engage the air inverter unit to prevent pivoting of the air inverter unit with respect to the connecting structure.

16. A CIPP liner feeder system, comprising:
   an air inverter unit having an inlet opening;
   a feed roller rotatably supported upon the air inverter unit, wherein the feed roller is positioned above the air inverter unit;
   a motor connected to the feed roller, wherein the motor is adapted to rotate the feed roller in a direction at a rotational speed to pull a CIPP liner from a liner source and feed the CIPP liner into the inlet opening of the air inverter unit;
   wherein the motor is comprised of a hydraulic motor; and
   a control unit in communication with the motor, wherein the control unit is configured to control the motor to adjust a rotational speed of the feed roller, and wherein the control unit is comprised of a valve box that controls a flow of hydraulic fluid from a hydraulic pressure source to the motor.

17. The CIPP liner feeder system of claim 16, wherein the rotational speed of the feed roller is slightly faster than a speed of the CIPP liner.

18. The CIPP liner feeder system of claim 16, wherein the control unit is configured to control the motor to increase or decrease the rotational speed of the feed roller.

19. A CIPP liner feeder system, comprising:
   an air inverter unit having an inlet opening;
   a connecting structure attached to the air inverter unit adapted for connecting to a lifting/lowering structure of a vehicle;
   a feed roller rotatably supported upon the air inverter unit, wherein the feed roller is positioned above the air inverter unit;
   a motor connected to the feed roller, wherein the motor is adapted to rotate the feed roller in a direction at a rotational speed to pull a CIPP liner from a liner source and feed the CIPP liner into the inlet opening of the air inverter unit;
   wherein the motor is comprised of a hydraulic motor; and
   a control unit in communication with the motor, wherein the control unit is configured to control the motor to adjust a rotational speed of the feed roller, wherein the control unit is comprised of a valve box that controls a flow of hydraulic fluid from a hydraulic pressure source to the motor, and wherein the control unit is configured to control the motor to increase or decrease the rotational speed of the feed roller.

20. The CIPP liner feeder system of claim 19, wherein the rotational speed of the feed roller is slightly faster than a speed of the CIPP liner.

* * * * *